(12) United States Patent
Livescu et al.

(10) Patent No.: US 11,940,584 B2
(45) Date of Patent: Mar. 26, 2024

(54) MULTI-SENSOR DATA ASSIMILATION AND PREDICTIVE ANALYTICS FOR OPTIMIZING WELL OPERATIONS

(71) Applicants: Silviu Livescu, Calgary (CA); Oladele Bello, Katy, TX (US)

(72) Inventors: Silviu Livescu, Calgary (CA); Oladele Bello, Katy, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 470 days.

(21) Appl. No.: 17/012,646

(22) Filed: Sep. 4, 2020

(65) Prior Publication Data

US 2022/0075086 A1 Mar. 10, 2022

(51) Int. Cl.

| | |
|---|---|
| *G01V 1/50* | (2006.01) |
| *E21B 47/07* | (2012.01) |
| *E21B 47/14* | (2006.01) |
| *G01V 1/28* | (2006.01) |
| *G06F 30/27* | (2020.01) |

(Continued)

(52) U.S. Cl.
CPC .............. *G01V 1/50* (2013.01); *E21B 47/07* (2020.05); *E21B 47/14* (2013.01); *G01V 1/282* (2013.01); *G06F 30/27* (2020.01); *G06N 20/00* (2019.01); *G06F 2119/02* (2020.01)

(58) Field of Classification Search
CPC ......... E21B 47/07; E21B 47/14; G06N 20/00; G01V 1/50; G01V 1/282; G06F 30/27; G06F 2119/02
See application file for complete search history.

(56) References Cited

U.S. PATENT DOCUMENTS

| | | | |
|---|---|---|---|
| 7,577,527 B2 * | 8/2009 | Vega Velasquez ...... | E21B 49/00 702/6 |
| 9,631,478 B2 * | 4/2017 | Livescu .................. | E21B 47/06 |

(Continued)

FOREIGN PATENT DOCUMENTS

WO 2019005908 A1 1/2019

OTHER PUBLICATIONS

International Search Report Issued in International Application No. PCT/US2021/048665 dated Dec. 21, 2021; 4 Pages.

(Continued)

*Primary Examiner* — Elias Desta
(74) *Attorney, Agent, or Firm* — CANTOR COLBURN LLP

(57) ABSTRACT

Examples described herein provide a computer-implemented method that includes analyzing a first dataset by applying the first dataset to a first model to generate a first result. The method further includes analyzing a second dataset by applying the second dataset to a second model to generate a second result. The method further includes performing validation on the first model and the second model by comparing the first result to the second result. The method further includes, responsive to determining that the first result and the second result match, modifying an operational action of a surface assembly based on at least one of the first result or the second result. The method further includes, responsive to determining that the first result and the second result do not match, updating at least one of the first model or the second model.

10 Claims, 13 Drawing Sheets

(51) Int. Cl.
  *G06N 20/00* (2019.01)
  *G06F 119/02* (2020.01)

(56) References Cited

U.S. PATENT DOCUMENTS

| | | | |
|---|---|---|---|
| 10,401,512 B1* | 9/2019 | Meek | G01V 1/282 |
| 2004/0168797 A1 | 9/2004 | Barrow | |
| 2008/0201080 A1* | 8/2008 | Lovell | G01F 1/684 |
| | | | 166/250.01 |
| 2018/0058189 A1 | 3/2018 | Quintero | |
| 2019/0338621 A1 | 11/2019 | Jin et al. | |
| 2020/0003042 A1 | 1/2020 | Zacharko et al. | |

OTHER PUBLICATIONS

Written Opinion Issued in International Application No. PCT/US2021/048665 dated Dec. 21, 2021; 4 Pages.

* cited by examiner

MULTI-SENSOR DATA ASSIMILATION AND PREDICTIVE ANALYTICS FOR OPTIMIZING WELL OPERATIONS

BACKGROUND

Embodiments described herein relate generally to downhole exploration and production efforts in the resource recovery industry and more particularly to techniques for multi-sensor data interpretation and predictive analytics for well intervention.

Downhole exploration and production efforts involve the deployment of a variety of sensors and tools. The sensors provide information about the downhole environment, for example, by collecting data about temperature, density, saturation, and resistivity, among many other parameters. This information can be used to control aspects of drilling and tools or systems located in the bottom hole assembly, along the drillstring, or on the surface.

SUMMARY

Embodiments of the present invention are directed to techniques for multi-sensor data interpretation and predictive analytics for well intervention.

A non-limiting example computer-implemented method includes analyzing a first dataset by applying the first dataset to a first model to generate a first result. The method further includes analyzing a second dataset by applying the second dataset to a second model to generate a second result. The method further includes performing validation on the first model and the second model by comparing the first result to the second result. The method further includes, responsive to determining that the first result and the second result match, modifying an operational action of a surface assembly based on at least one of the first result or the second result. The method further includes, responsive to determining that the first result and the second result do not match, updating at least one of the first model or the second model.

A non-limiting example system includes a surface assembly and a processing system. The processing system includes a memory comprising computer readable instructions. The processing system further includes a processing device for executing the computer readable instructions, the computer readable instructions controlling the processing device to perform operations. The operations include analyzing a first dataset by applying the first dataset to a first model to generate a first result. The operations further include analyzing a second dataset by applying the second dataset to a second model to generate a second result. The operations further include performing validation on the first model and the second model by comparing the first result to the second result. The operations further include, responsive to determining that the first result and the second result match, modifying an operational action of the surface assembly based on at least one of the first result or the second result. The operations further include responsive to determining that the first result and the second result do not match, updating at least one of the first model or the second model.

A non-limiting example method for processing downhole multisensor data representative of a well operations includes using a physics-informed model, representative of function of a well operations, coded into one or more computer systems. The method further includes using a fitting constant related to at least one of a reservoir rock, a fluid, a thermal, a completion, and a wellbore intervention property. The method further includes generating a prior probability distribution function using the physics-informed model. The method further includes repetitively fusing input data originating from at least a first downhole sensor and a second downhole sensor with the prior probability distribution function to generate a posterior probability distribution function. The method further includes processing the posterior probability distribution function with the one or more computer systems to generate in real-time an output.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

Referring now to the drawings wherein like elements are numbered alike in the several figures.

DETAILED DESCRIPTION

Modern bottom hole assemblies (BHAs) are composed of several distributed components, such as sensors and tools, with each component performing data acquisition and/or processing of a special purpose. Some BHAs, such as those used in wireline logging operations and logging while drilling (LWD) operations, provide for fluid analysis sampling and testing to obtain formation pressure and formation fluid samples while drilling.

Figure 1:
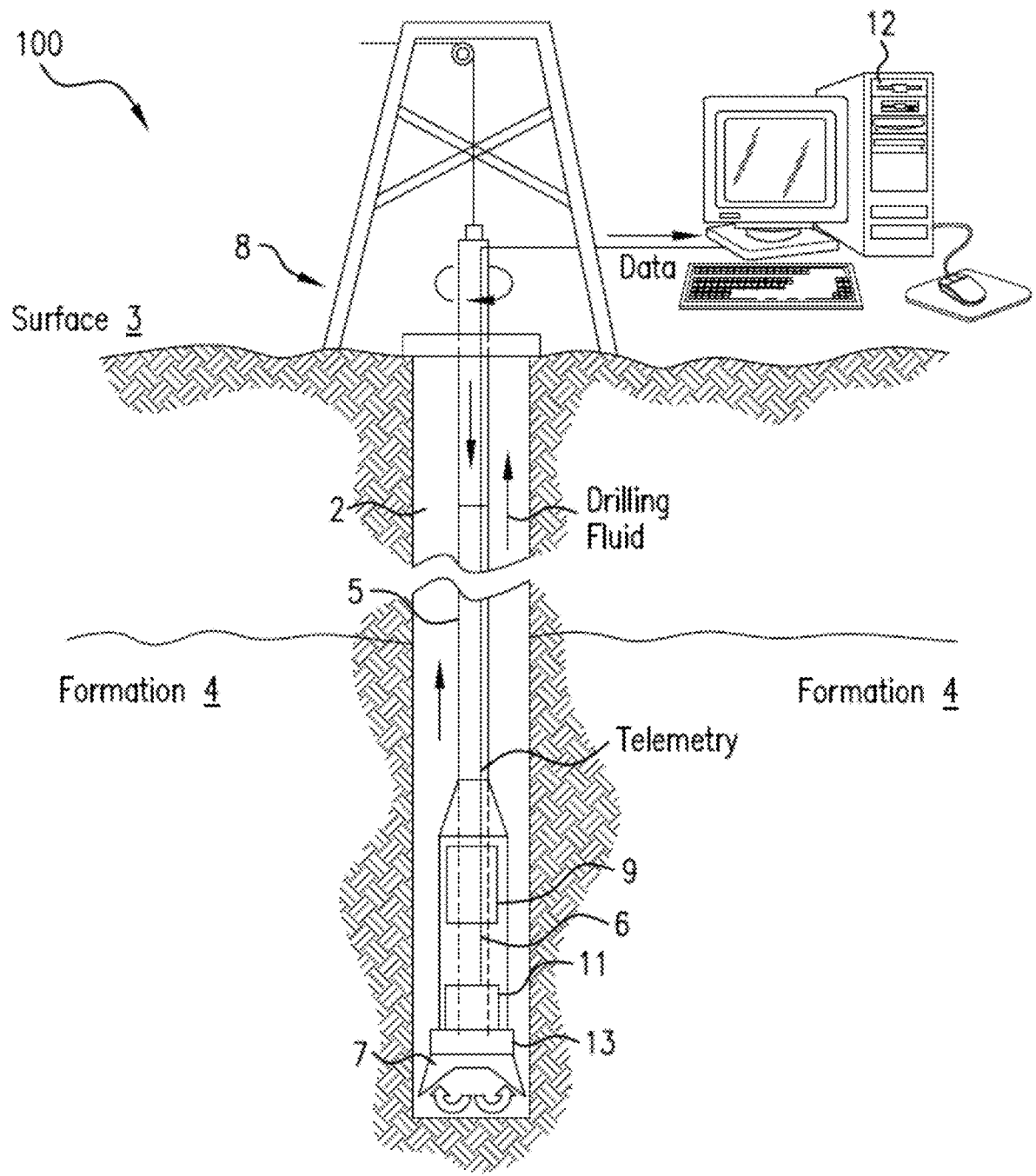
FIG. 1 depicts a cross-sectional view of a wellbore operation according to one or more embodiments described herein.

Wellbores are drilled into a subsurface to produce hydrocarbons and for other purposes. In particular, FIG. 1 depicts a cross-sectional view of a wellbore operation system 100, according to aspects of the present disclosure. In traditional wellbore operations, LWD measurements are conducted during a drilling operation to determine formation rock and fluid properties of a formation 4. Those properties are then used for various purposes such as estimating reserves from saturation logs, defining completion setups, etc. as described herein.

The system and arrangement shown in FIG. 1 is one example to illustrate the downhole environment. While the system can operate in any subsurface environment, FIG. 1 shows a carrier 5 disposed in a borehole 2 penetrating the formation 4. A tool 7 is disposed in the borehole 2 at a distal end of a carrier 5, as shown in FIG. 1.

As shown in FIG. 1, the carrier 5 is a tool string that includes a BHA 13. The BHA 13 is a part of the drilling rig or coiled tubing unit 8 (also referred to as a "surface assembly") and may include drill collars, stabilizers, reamers, motors, turbines, reel, injector, coiled tubing, and the like, and the drill bit or coiled tubing tool 7. In examples, the downhole tool 7 is disposed at a forward end of the BHA 13. The BHA 13 also includes sensors (e.g., measurement tools 11) and electronic components (e.g., downhole electronic components 9). The measurements collected by the measurement tools 11 can include measurements related to downhole operations during drilling, completing, or intervening into a well, for example. The surface assembly 8 also pumps drilling, completion, or well intervention fluid through the drill string or coiled tubing. The measurement tools 11 and downhole electronic components 9 are configured to perform one or more types of measurements in an embodiment known as logging-while-drilling (LWD) or measurement-while-drilling (MWD) according to one or more embodiments described herein. In examples, the measurement tools 11 and downhole electronic components 9 are configured to perform downhole telemetry measurements during well intervention operations. This can include, for example, fluid sampling operations, production profiling, acid stimulation, hydraulic fracturing, fishing, milling, etc.

Data is collected by the measurement tools 11 and transmitted to the downhole electronic components 9 for processing. The data can be transmitted between the measurement tools 11 and the downhole electronic components 9 by a wire 6, such as a powerline, which transmits power and/or data between the measurement tools 11 and the downhole electronic components 9, and/or by a wireless link (not shown) between the measurement tools 11 and the downhole electronic components 9. Power is generated downhole by a turbine-generation combination (not shown), and communication to the surface 3 (e.g., to a processing system 12) is cable-less (e.g., using mud pulse telemetry, electromagnetic telemetry, acoustic telemetry, etc.) and/or cable-bound (e.g., using a cable to the processing system 12). The data processed by the downhole electronic components 9 can then be telemetered to the surface 3 via the wire 6, for example, by a telemetry system like a mud pulser, utilizing fluid pressure variations, or by an electromagnetic telemetry system utilizing electromagnetic waves, with telemetry techniques for additional processing or display by the processing system 12.

Downhole control signals can be generated by the processing system 12 (e.g., based on the raw data collected by the measurement tools 11) and conveyed downhole or can be generated within the downhole electronic components 9 or by a combination of the two according to embodiments of the present disclosure. The downhole electronic components 9 and the processing system 12 can each include one or more processors and one or more memory devices. In alternate embodiments, computing resources such as the downhole electronic components 9, sensors, and other tools can be located along the carrier 5 rather than being located in the BHA 13, for example. The borehole 2 can be vertical as shown or can be in other orientations/arrangements (see, e.g., FIG. 3).

Figure 2:
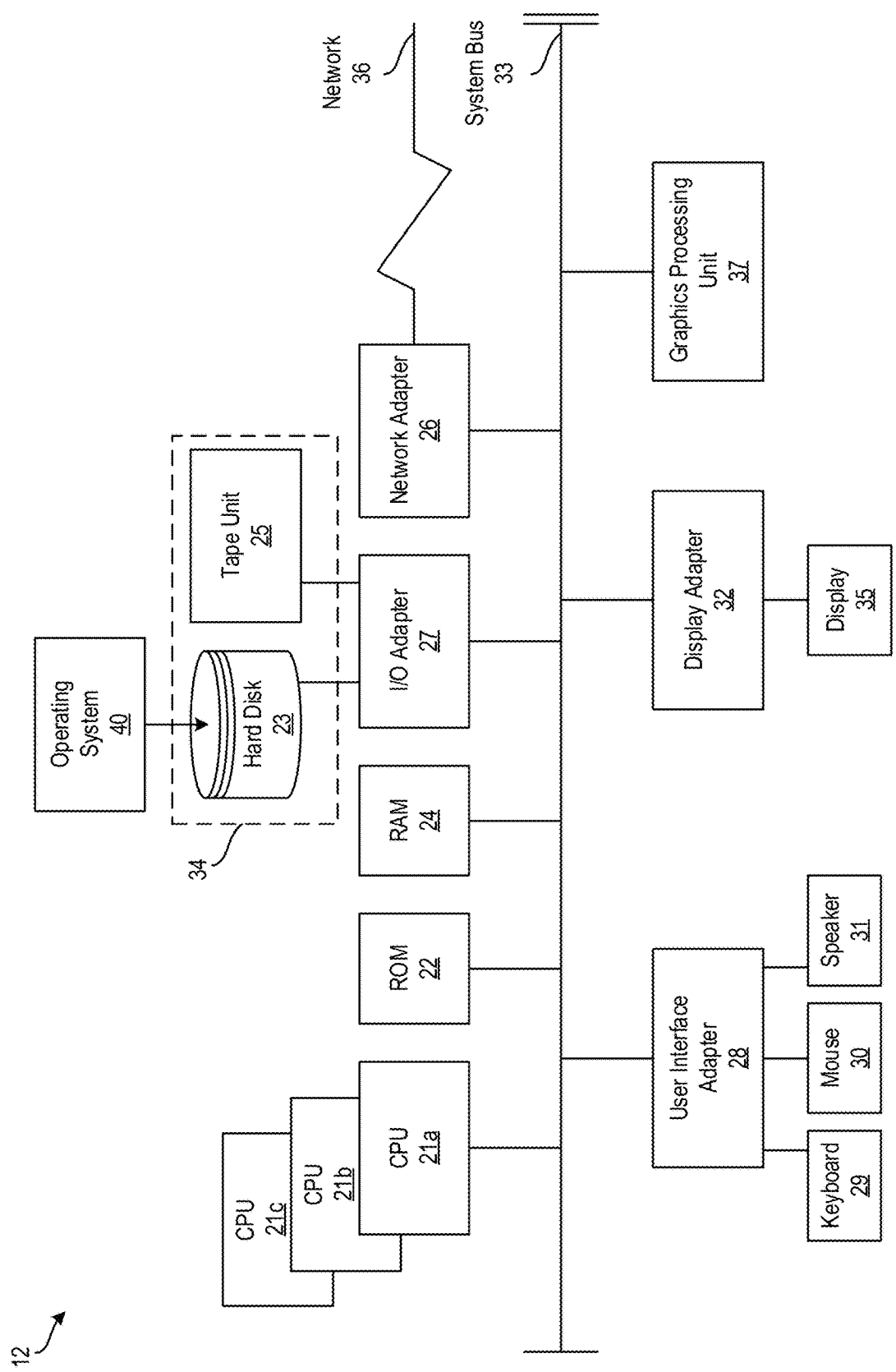
FIG. 2 depicts a block diagram of the processing system of FIG. 1, which can be used for implementing the present techniques herein according to one or more embodiments described herein.

It is understood that embodiments of the present disclosure are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units 21a, 21b, 21c, etc. (collectively or generically referred to as processor(s) and/or as processing device(s)). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 12.

Further illustrated are an input/output (I/O) adapter 27 and a network adapter 26 coupled to system bus 33. I/O adapter 27 can be a small computer system interface (SCSI) adapter that communicates with a hard disk 23 and/or a tape storage device 25 or any other similar component. I/O adapter 27, hard disk 23, and tape storage device 25 are collectively referred to herein as mass storage 34. Operating system 40 for execution on the processing system 12 can be stored in mass storage 34. The network adapter 26 interconnects system bus 33 with an outside network 36 enabling processing system 12 to communicate with other such systems.

A display (e.g., a display monitor) 35 is connected to system bus 33 by display adapter 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 12. The system memory (e.g., the RAM 24) can also store computer readable instructions for performing various operations as described herein.

According to examples described herein, techniques for multi-sensor data assimilation and predictive analytics for optimizing well operations are provided. The availability of downhole sensors (both single and distributed sensors) produces significant volumes of data about a downhole environment in wellbore operations. Knowledge of real-time (or near real-time) estimation and prediction in wellbore operations provides a useful input for monitoring and controlling wellbore operations (e.g., physical petroleum engineering systems within broader enterprise operations, such as artificial lift systems, intelligent completion systems, chemical injection systems, well stimulation systems (e.g., matrix acidizing and hydraulic fracturing), enhanced oil recovery processes (e.g., water, polymer, and chemical flooding), petrophysical properties estimation, geological carbon storage operations, wellbore intervention, and others). Such downhole data can be analyzed and verified using the present techniques to provide nearly instantaneously decision making in wellbore operations.

In particular, according to one or more embodiments described herein, downhole temperature sensors (DTS) and downhole acoustics sensors (DAS) produce data. Each data set (from DTS and DAS) can be used separately to convert the sensed data into output flows (i.e., flow allocation along the well) in real-time or near real-time using various models. The output flows from the DTS and DAS data can be compared to verify the models. If the output flows agree (i.e., match), the confidence of accuracy in the results can be assumed. However, if the output flows do not agree, data science and data analytics can be used to iteratively adjust input parameters to the model until the output flows match. Having two different, independent models and comparing the output flows provides improved accuracy than having the results from only one dataset/model combination that is not validated against something else (i.e., another dataset/model combination).

Downhole single point (e.g., permanent downhole gauge (PDG), downhole flow meter (DHFM), etc.) and distributed sensor systems (e.g., permanently- and/or temporarily-installed fiber optics) provide qualitative online well monitoring. However, improved quantitative forecasts can be achieved according to one or more embodiments described herein to optimize multi-sensor data utilization and enhance petroleum engineering systems' state estimation, model predictive control, and operate efficiently. Existing approaches are not well-suited to assimilate in real-time multi-scale downhole multi-sensor data, such as PDG, DHFM, DTS, DAS, distributed strain sensing data, and imaging data.

The techniques described herein provide a predictive analytics framework that assimilates downhole multi-scale multi-sensor heterogeneous data and provide actionable information for real-time monitoring, optimization, and control of physical petroleum engineering systems as described herein. One or more embodiments described herein effectively extract actionable information from multi-length/time/frequency scale data at the well and reservoir levels and build an effective decision support system for early detection, diagnostics, and prognosis (mitigation) using predictive analytics and big data monitoring and control.

In some examples, machine learning is applied to extract flow signatures from multi-sensor heterogeneous big data within a downhole single point and distributed sensing data architecture. Numerical simulation and machine learning can be coupled to develop probabilistic proxy models using simulation analytics. A feedback connection can be established between real petroleum engineering systems to the simulation model by utilizing the real-time data collected from the actual physical petroleum engineering systems. By assimilating these data from the actual physical petroleum engineering systems, the simulation system can continuously adjust/improve itself, for example, to estimate state variables and due model parameters based on model/observation differences in order to achieve more accurate predictions. Short and medium-range probabilistic forecasting can be performed using distributed and cloud computing, for example. Mathematical and cyber-infrastructure tools can be integrated with physical multi-scale sensing data platforms for active information gathering and subsequent decision support for optimization strategies.

According to one or more embodiments described herein, the present techniques enable real-time monitoring, optimization, and control of physical petroleum engineering systems (e.g., a surface assembly) using a real-time distributed multi-sensor data fusion and assimilation approach. The present techniques can recommend mitigation decision efforts and gain efficiency.

Figure 3:
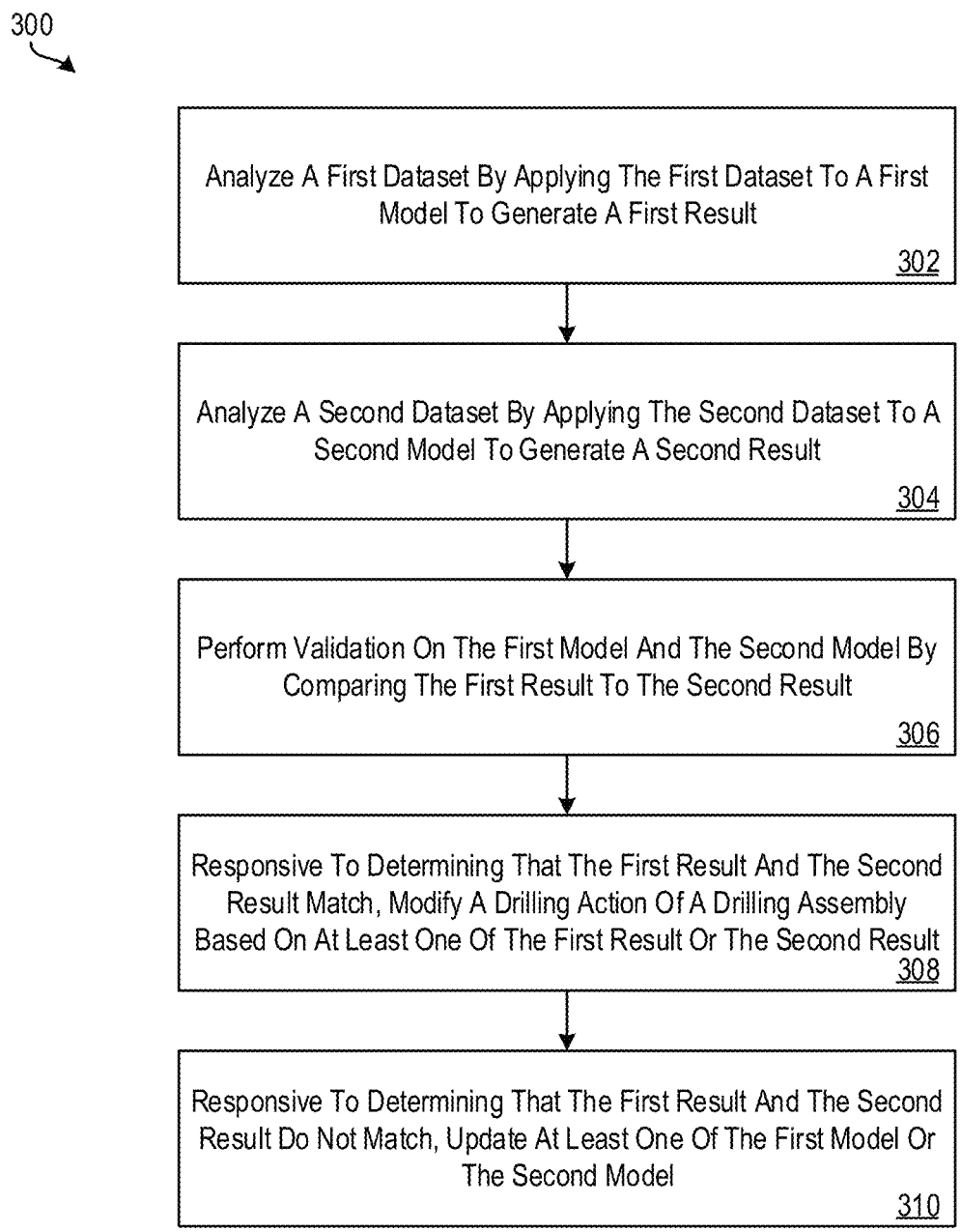
FIG. 3 depicts a flow diagram of a method for multi-sensor data interpretation and predictive analytics for well intervention according to one or more embodiments described herein.

FIG. 3 depicts a flow diagram of a method 300 for multi-sensor data interpretation and predictive analytics for well intervention according to one or more embodiments described herein. The method 300 can be performed by any suitable processing system (e.g., the processing system 12), any suitable processing device (e.g., one of the processors 21), and/or combinations thereof or the like or another suitable system or device.

Figure 4:
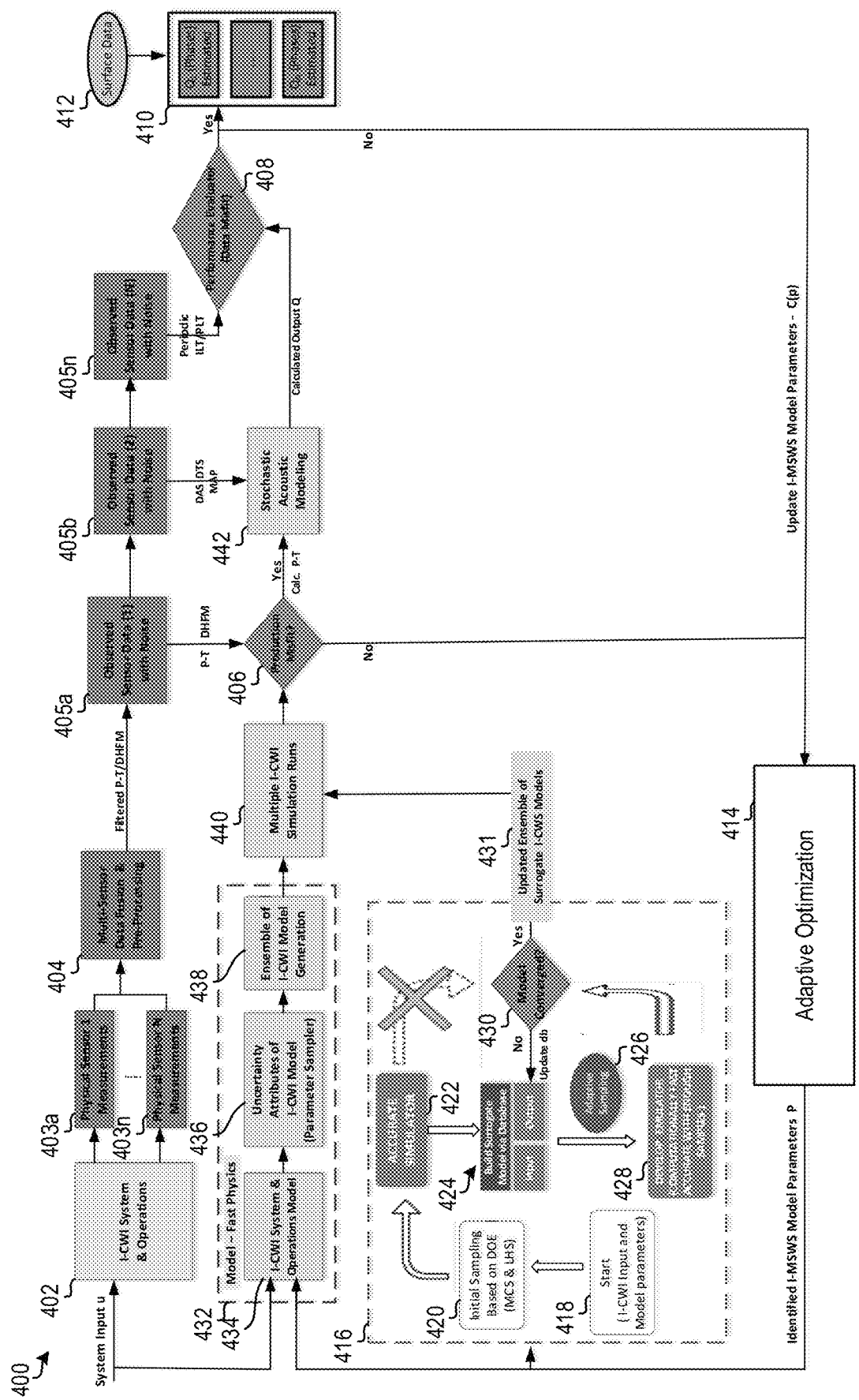
FIGS. 4-12 depict diagrams representative of methods for multi-sensor data assimilation and predictive analytics for optimizing well intervention operations according to one or more embodiments described herein.

At block 302, the processing system 12 analyzes a first dataset by applying the first dataset to a first model to generate a first result. At block 304, the processing system 12 analyzes a second dataset by applying the second dataset to a second model to generate a second result. The first dataset and the second dataset can include data collected by one or more downhole sensors (e.g., the measurement tools 11 of FIG. 1) that collect data about the downhole environment. The first dataset and/or the second dataset can be collected by optical sensors and/or single point sensors. According to one or more embodiments described herein, the first dataset can be received from one or more temperature sensors associated with the surface assembly, and the second dataset can be received from one or more acoustic sensors associated with the surface assembly. It should be appreciated that other types of data can be used. For example, a dataset can include one of force data, pressure data, temperature data, acoustic data, and nuclear data. In some examples, the first dataset and the second dataset are collected from the same wellbore; however, the first and second datasets can be collected from different wellbores in other examples. FIG. 4 depicts an example of how data, such as the first dataset and/or the second dataset, are analyzed. FIG. 4 illustrate computer implemented technique for assimilating observed multi-sensor data with a computer implemented physics and data-driven models or algorithms that represents well operations (intelligent completion and wellbore intervention operations).

In particular, FIG. 4 depicts a flow diagram of a method 400 for multi-sensor data interpretation and predictive analytics for well intervention according to one or more embodiments described herein. This example is described with reference to analyzing the first dataset (e.g., block 302 of FIG. 3) but is also applicable to analyzing other datasets, such as analyzing the second dataset (e.g., block 304 of FIG. 3). Data are received as a system input u into an intelligent completion wellbore intervention (I-CWI) system and operations block 402, which continuously collects data about a wellbore operation (e.g., the wellbore operation system 100 of FIG. 1) via measurements taken by physical sensors 403*a*-403*n* (e.g., measurement tools 11). Multi-sensor data fusion and pre-processing is performed on the measurements from the physical sensors 403*a*-403*n* at block 404, and a filtered pressure-temperature output (referred to as downhole flow meter (DHFM) data) is output. Particularly, block 404 provides for combining/fusing sensor data from the physical sensors 403a-403n, where in block 404, pre-processing is performed to clean the data. Cleaning the data can include filtering out unwanted data, such as noise or outliers. The pre-processing can also include determining acoustic emission (AE) (e.g., AE root mean square (AE-RMS), sound speed profiling, features extraction, etc.) and temperature-pressure (T-P) information.

Such data is input into observed sensor data with noise blocks 405a, 405b, . . . 405n iteratively as shown.

In one example, at a first iteration the observed sensor data with noise block 405a outputs pressure-temperature and/or DHFM data into a production misfit decision block 406 where it is determined whether the data from block 405a indicates a production misfit. If so, pressure-temperature data is fed into a stochastic acoustic modeling block 442, and a calculated flow rate Q is generated and input into a performance evaluator block 408. The performance evaluator block 408 determines whether the output of block 406 matches expected output from a model. If the output of block 442 matches the expected output from the model, an output flow 410 is generated based on the output of block 442 as well as injection log (ILT) and production log (PLT) data 412. The output flow 410 can include multiple Q values for phase. This is a flow rate of the wellbore (or whatever is cutting into the wellbore).

If the output of block 442 does not match the expected output from the model as determined by the performance evaluator block 408 or if it is determined that a production misfit exists at decision block 406, the model can be updated by updating model parameters using statistical and/or machine learning techniques in the adaptive optimization block 414. Further details of the adaptive optimization block 414 are shown in more detail in FIGS. 5-12.

Figure 5:
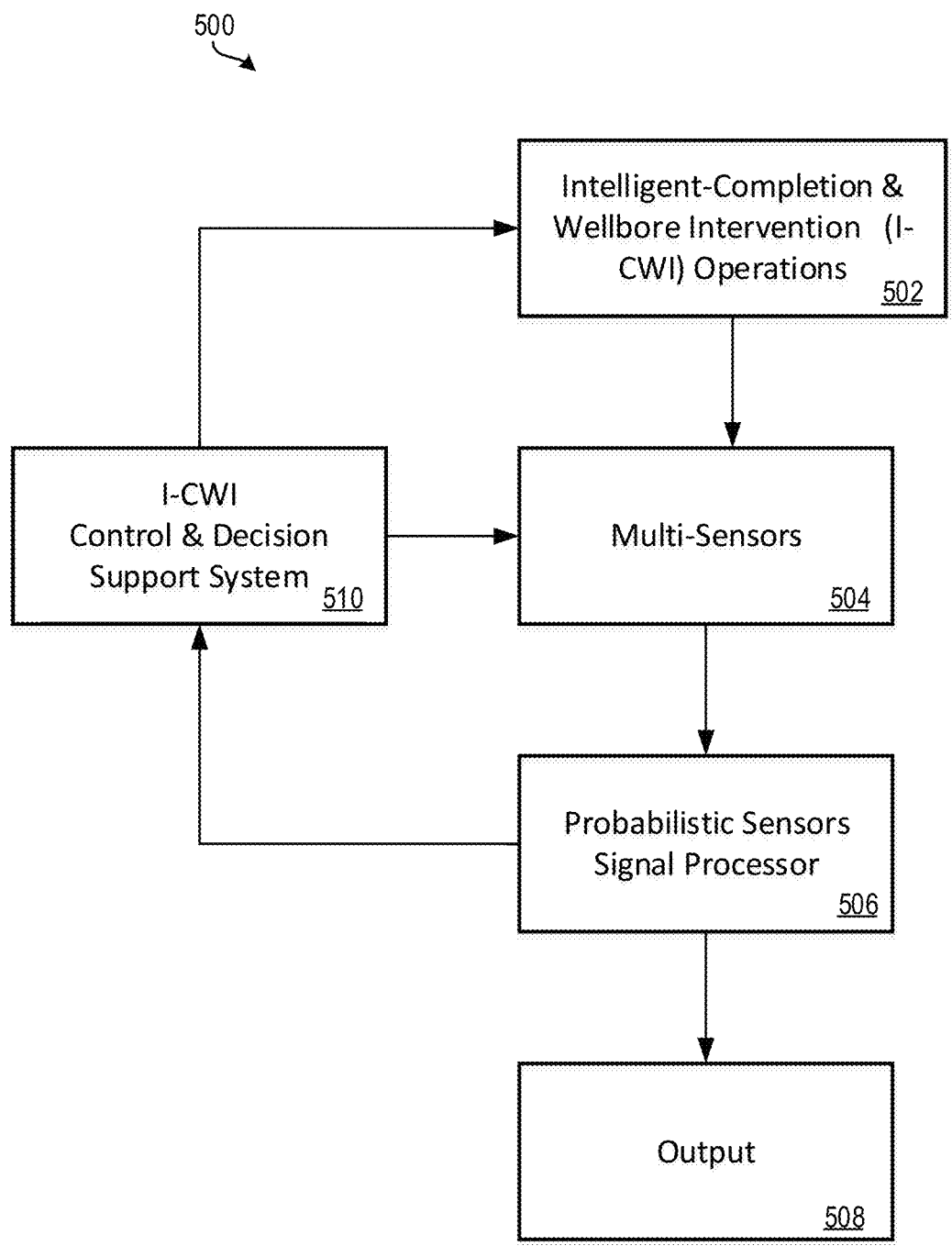

FIG. 5 depicts a block diagram of a system 500 for multi-sensor data assimilation and predictive analytics for optimizing well intervention operations according to one or more embodiments described herein. An I-CWI operations block uses multi-sensors (i.e., a plurality of sensors) 504 to collect data about a wellbore operation. Data is passed from the multi-sensors 504 to a probabilistic sensors and signal processor 506, which performs pre-processing to configure noise. That is, the probabilistic sensors and signal processor 506 determines how much noise is added. The system 500 then generates an output 508, such as a flow rate or another suitable output. The system 500 also provides the output 508 to an I-CWI control and decision support system 510 that makes drilling or completion decisions. Accordingly, the I-CWI control and decision support system uses the output 508 of the system 500 for multi-sensor data assimilation and predictive analytics to optimize and improve well intervention operations.

Figure 6:
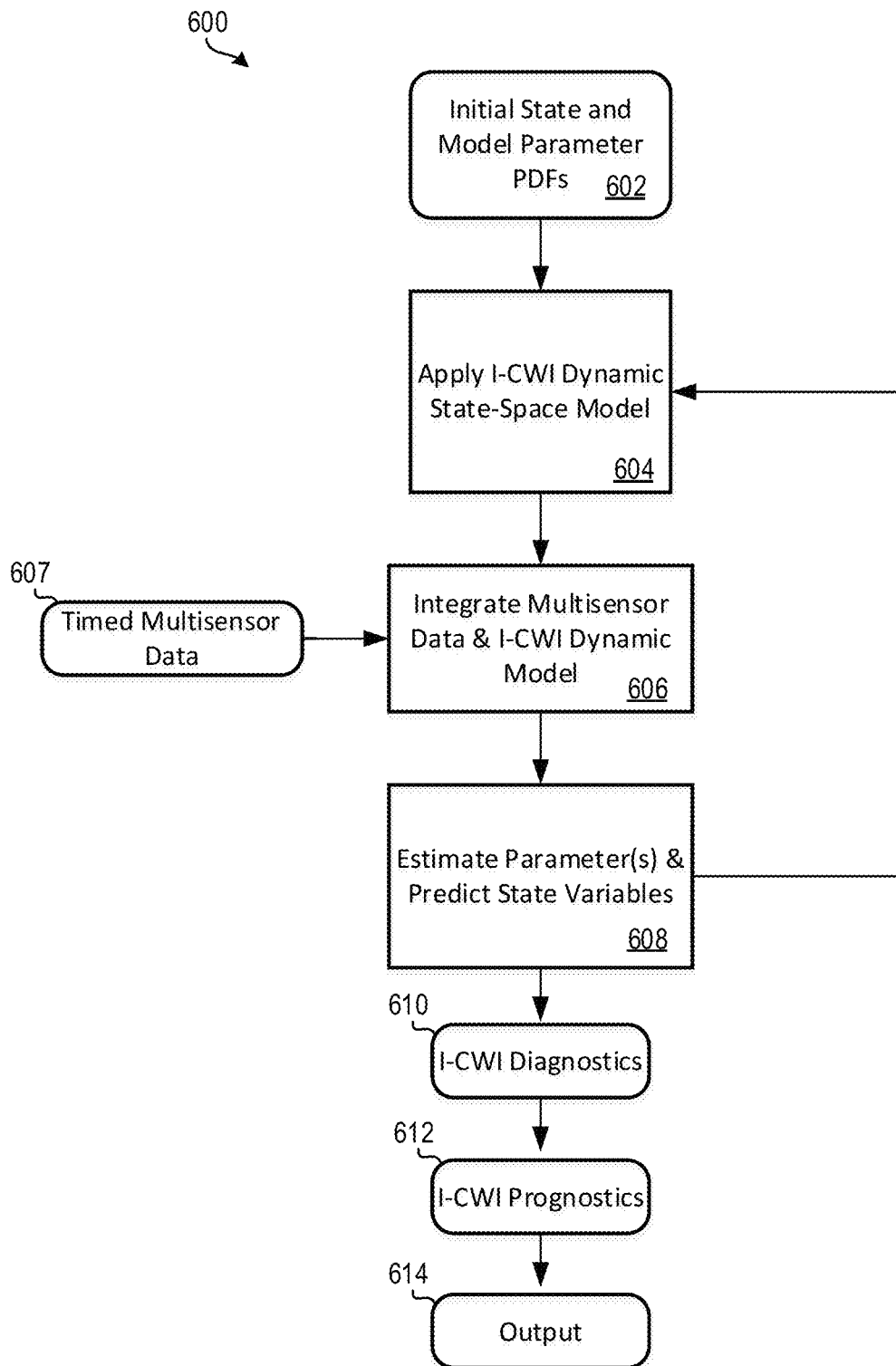

FIG. 6 depicts a flow diagram of a method 600 for multi-sensor data assimilation and predictive analytics for optimizing well intervention operations according to one or more embodiments described herein. At block 602, initial state and model parameter probability density functions (PDFs) are received and applied to an I-CWI dynamic state-space model at block 604. The PDFs are a measure of adding noise to model parameters. At block 606, multisensory data and the I-CWI dynamic model are integrated using timed multisensory data 607, which has spatial and temporal aspects. I-CWI diagnostics and prognostics are performed at blocks 610 and 612 respectively to evaluate and analyze current data (diagnostics) and future data (prognostics). Results are output at block 614.

Figure 7:
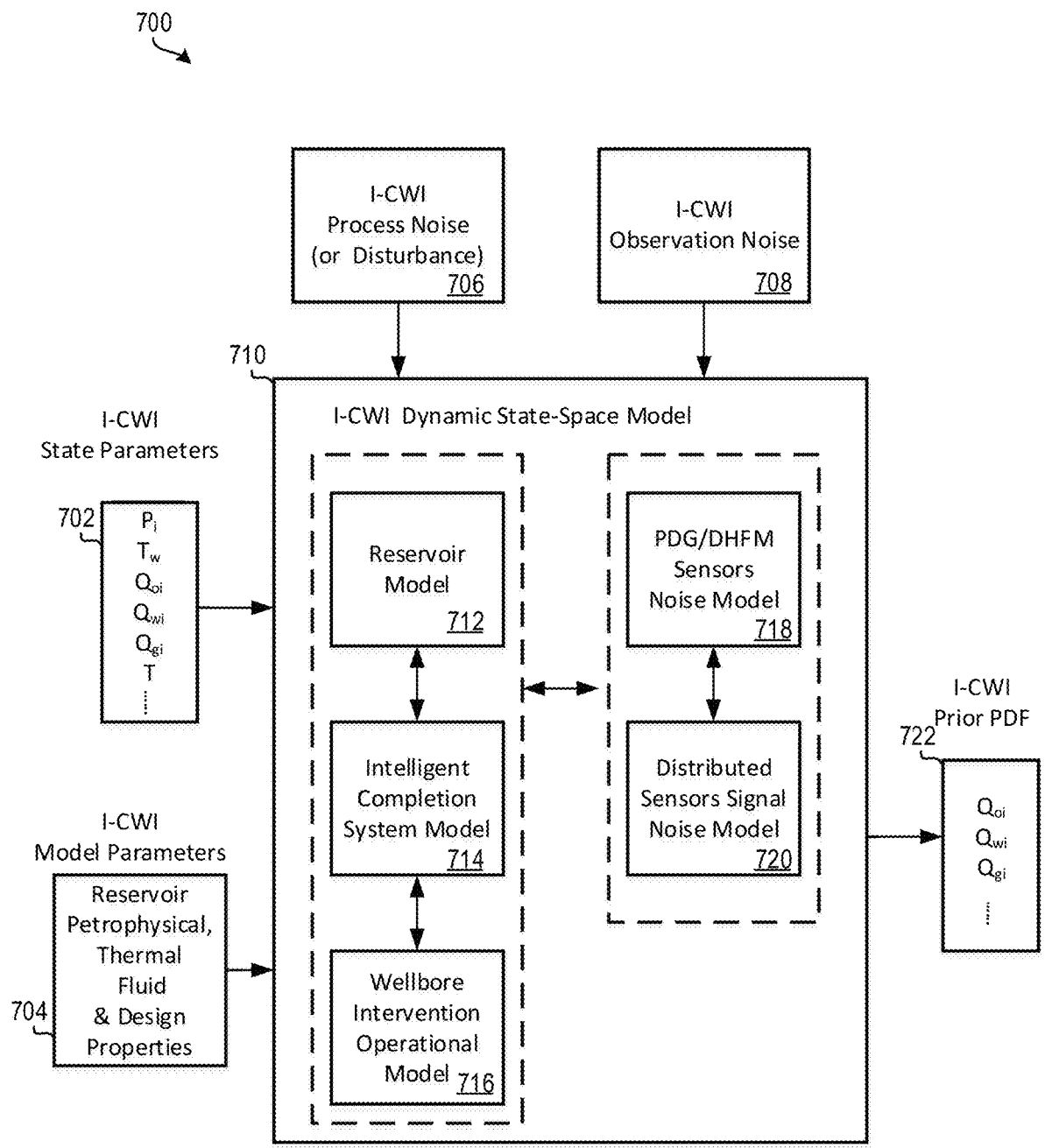

FIG. 7 depicts a block diagram of a system 700 for multi-sensor data assimilation and predictive analytics for optimizing well intervention operations according to one or more embodiments described herein. I-CWI state parameters 702 (e.g., temperature, pressure, flow rates, etc.) and I-CWI model parameters 704 (e.g., reservoir, petrophysical, thermal, fluid, and design properties) are input into the I-CWI dynamic state-space model 710 (see FIG. 6, block 604). The I-CWI state-space dynamic model 710 also receives I-CWI process noise (or disturbance) 706 and I-CWI observation noise 708. The I-CWI state-space dynamic model 710 processes the received information using a reservoir model 712, an intelligent completion system model 714, a well intervention operational model 716, a permanent down gauge (PDG)/DHFM sensors noise model 718, and a distributed sensors signal noise model 720 to generate an I-CWI prior probability density function 722 in the form of a flow rate or flow rates.

Figure 8:
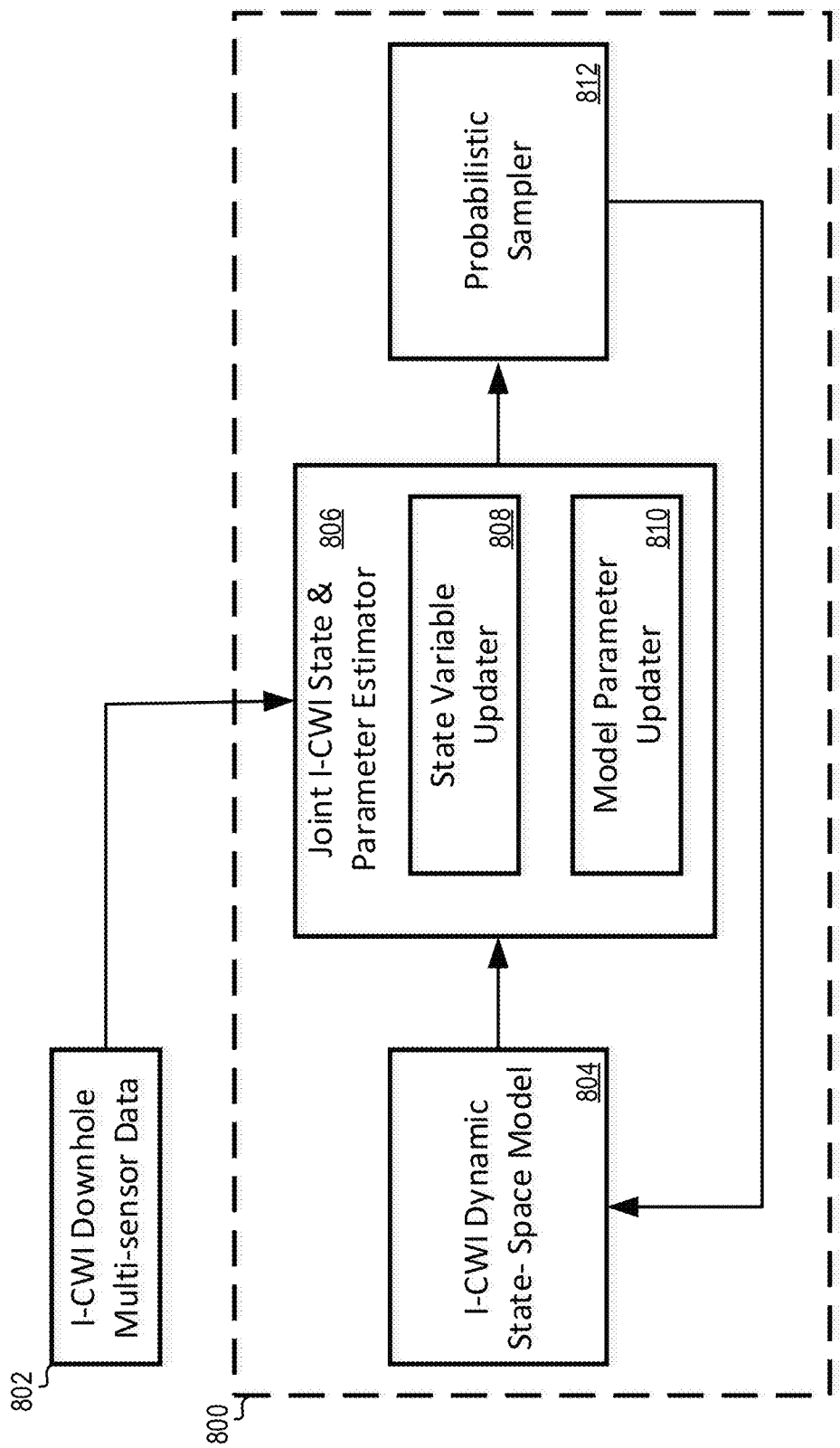

FIG. 8 depicts a block diagram of a system 800 for multi-sensor data assimilation and predictive analytics for optimizing well intervention operations according to one or more embodiments described herein. The system 800 receives I-CWI downhole multi-sensor data 802 as described herein via a joint I-CWI state and parameter estimator 806. The joint I-CWI state and parameter estimator 806 uses a state variable updater 808 and a model parameter updater 810 to update the data (see block 802) based on an I-CWI dynamic state-space model 804. Results of the joint I-CWI state and parameter estimator 806 are input into a probabilistic sampler 812 which detects the future behavior of the state variables and model parameters. The probabilistic sampler 812 results can be used to update/adjust the I-CTWI dynamic state-space model 804.

Figure 9:
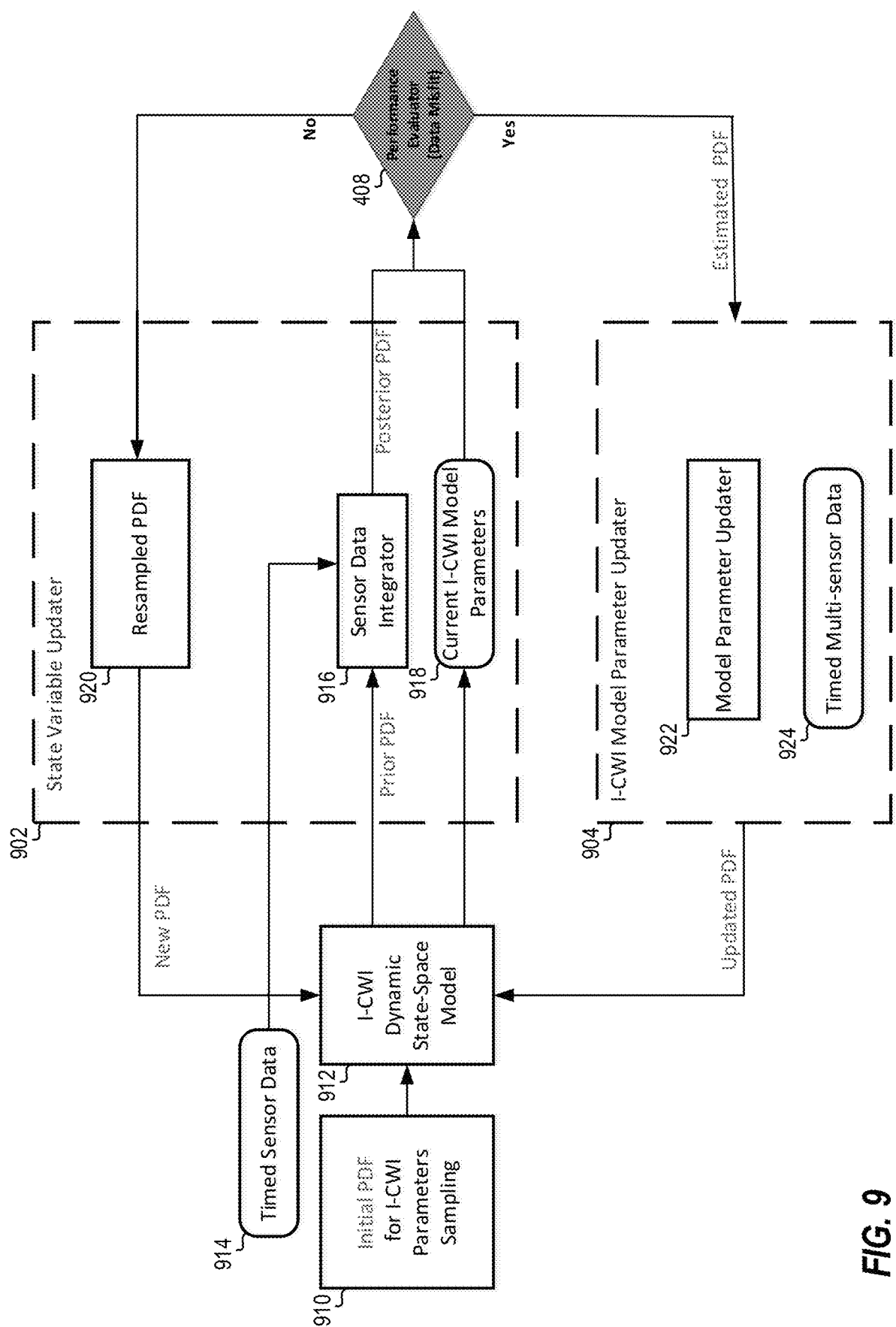

FIG. 9 depicts a block diagram of a system 900 for multi-sensor data assimilation and predictive analytics for optimizing well intervention operations according to one or more embodiments described herein. A state variable updater 902 updates state variables to generate a posterior probability density function and a new probability density function. An I-CWI model parameter updater 904 uses an estimated probability density function to generate an updated probability density function. These processes are now further described.

An initial probability density function 910 is created for I-CWI parameters sampling and is used by the I-CWI dynamic state-space model 912 to generate a prior probability density function based on past data. The state variable updater 902 receives timed sensor data 914 at a sensor data integrator. The timed sensor data 914 is fused by a sensor data integrator 916 and a posterior probability density function is generated by the sensor data integrator 916 based on the prior probability density function generated by the I-CWI dynamic state-space model 912. The state variable updater 902 also uses current I-CWI model parameters 918 to generate the posterior probability density function using the prior probability density function. The state variable updater is input into a performance evaluator 408 (see FIG. 4, block 408) to evaluate the performance of the posterior probability density function. If the data is not misfit at block 408, the state variable updater 902 resamples the probability density function at block 920 to generate a new probability density function. If the data is misfit at block 408, the I-CWI model parameter updater 904 uses an estimated probability density function (as a flow rate) to generate an updated probability density function using a model parameter updater 922 and timed multi-sensor data 924.

Figure 10A:
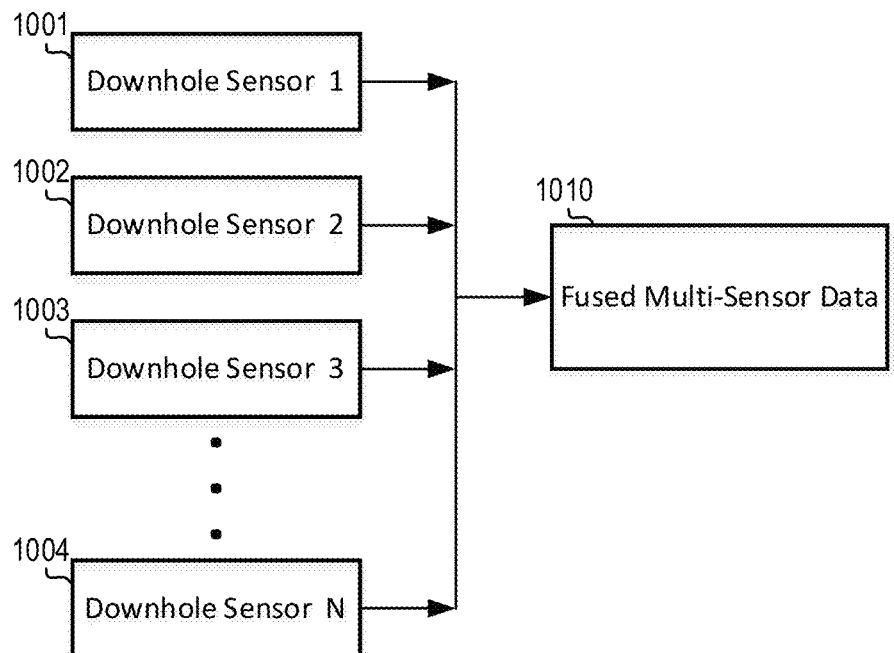
Figure 10B:
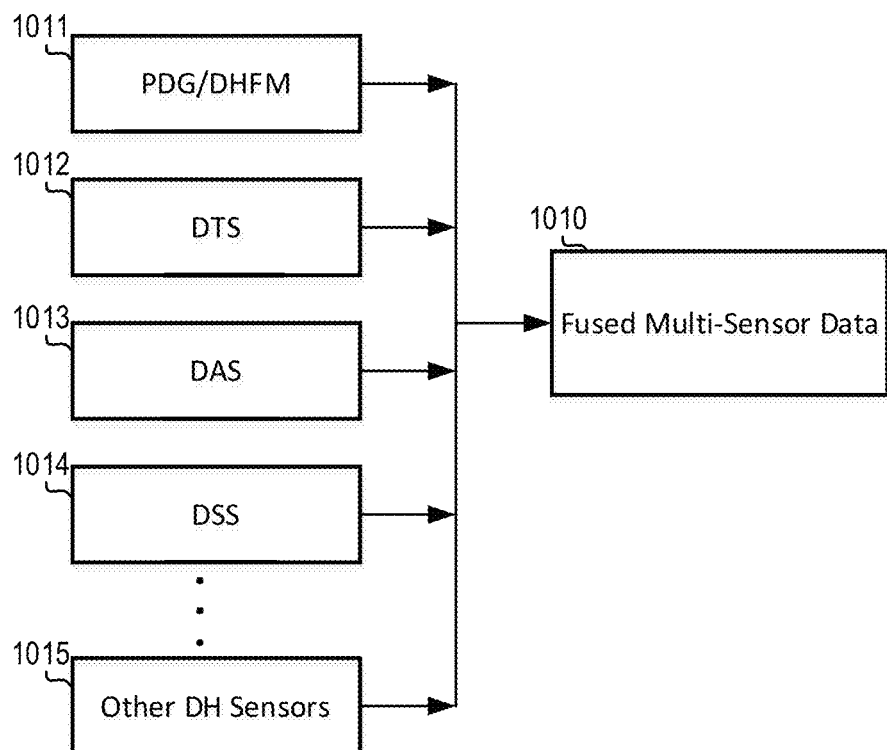

FIG. 10A depicts fused multi-sensor data 1010 from downhole sensors 1001, 1002, 1003, 1004 as shown. As an example, FIG. 10B depicts that fused multi-sensor data 1010 is generated from a PDF/DHFM sensor 1011, a downhole temperature sensor (DTS) 1012, a downhole acoustic sensor (DAS) 1013, a downhole strain sensor (DSS) 1014, and/or other downhole sensors 1015.

Figure 11:
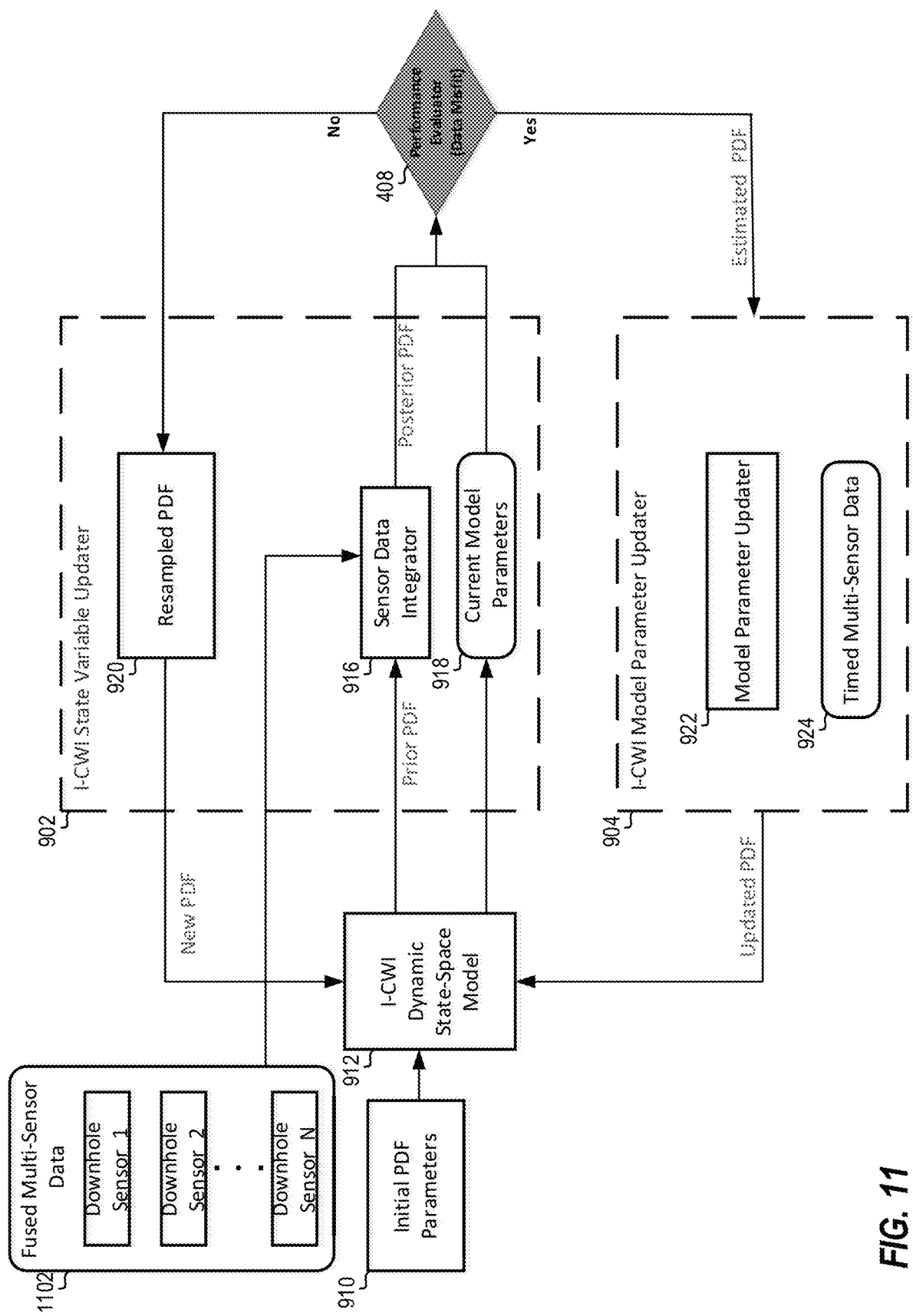

FIG. 11 depicts a block diagram of a system 1100 for multi-sensor data assimilation and predictive analytics for optimizing well intervention operations according to one or more embodiments described herein. The system 1100 is similar to the system 900 of FIG. 9. The system 1100 uses fused multi-sensor data 1102 instead of timed sensor data 914. The fused multi-sensor data 1102 can be measured by downhole sensors 1, 2, . . . N.

Figure 12:
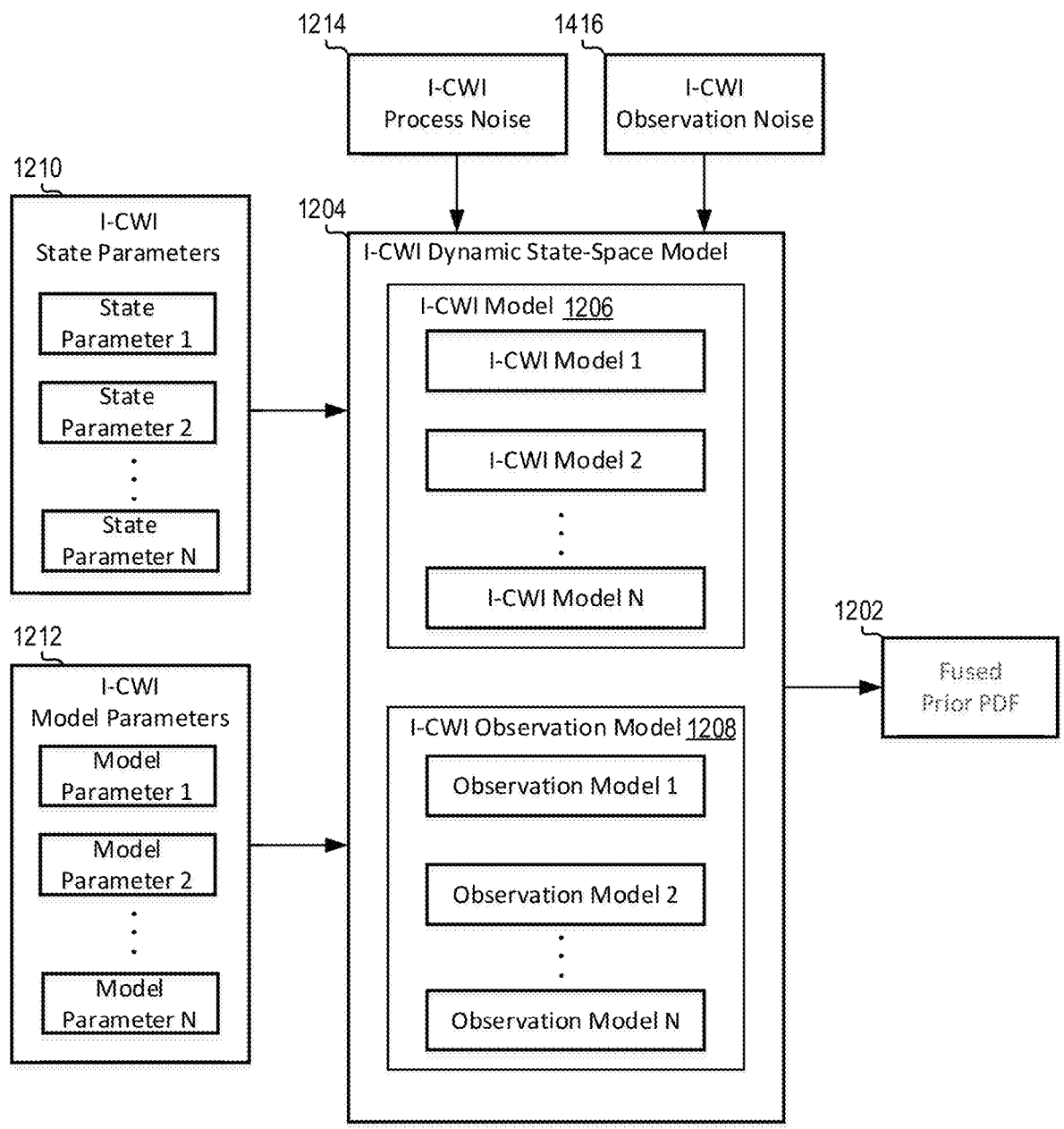
Figure 13:
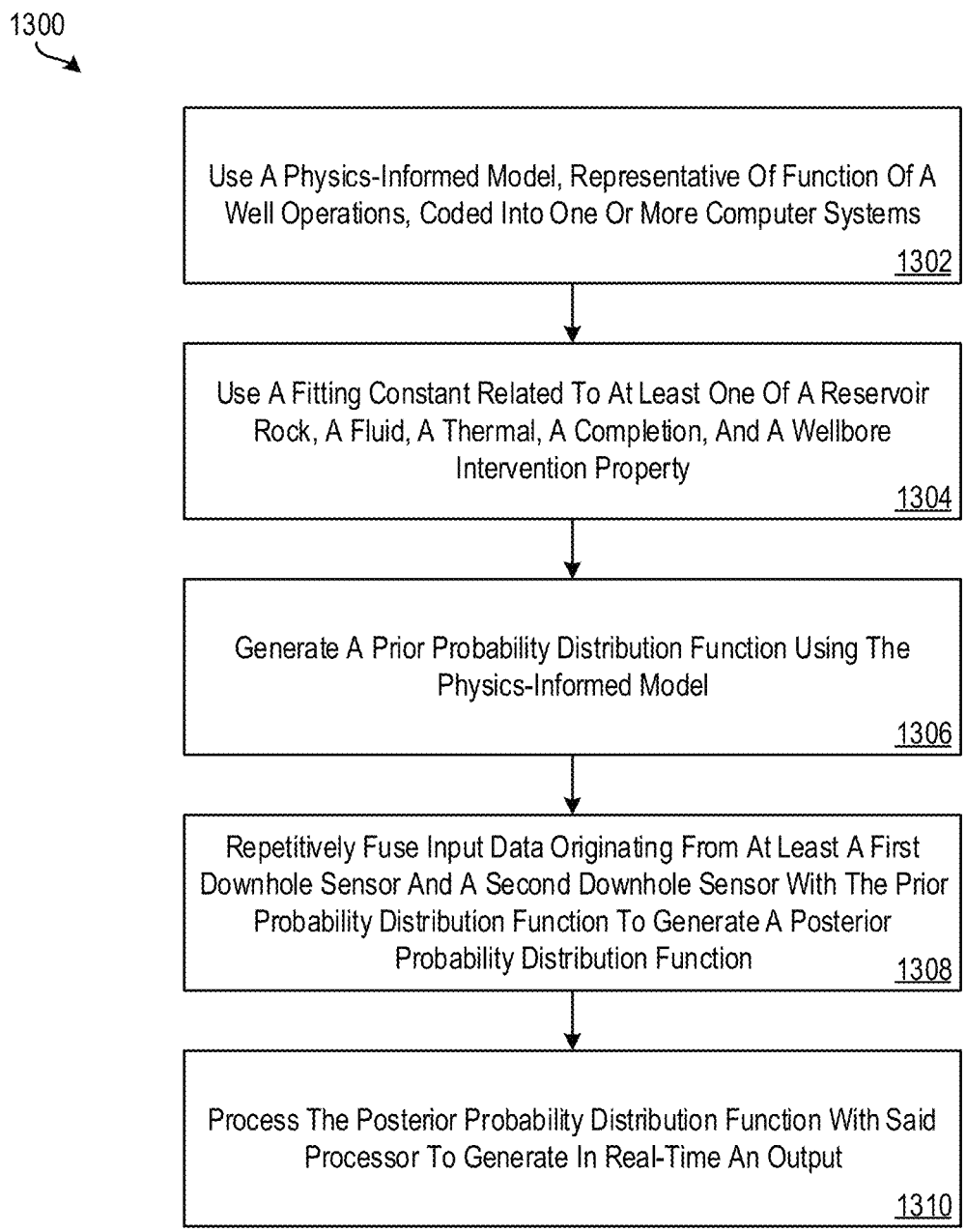
FIG. 13 depicts a method for processing downhole multisensory data representative of a well operations according to one or more embodiments described herein.

FIG. 12 depicts a block diagram of a system 1200 for multi-sensor data assimilation and predictive analytics for optimizing well intervention operations according to one or more embodiments described herein. In this example, a fused prior probability density function 1202 is generated by an I-CWI dynamic state-space model 1204. The I-CWI dynamic state-space model 1204 uses I-CWI models 1204 and I-CWI observation models 1208 to generate the fused prior probability density function 1202 using I-CWI state parameters 1210, I-CWI model parameters 1212, I-CWI process noise 1214, and I-CWI observation noise 1216.

With continue reference to FIG. 4 once the adaptive optimization at block 414 has been performed, parameters P to be updated can be identified, for example, based on the model desired to be updated. In some examples, one of the parameters P is updated at a time. In some examples, one or more of the parameters P are updated iteratively. Model updating occurs at block 416 for the identified parameter(s) P. Inputs at block 418, such as from the I-CWI system 402 (e.g., reservoir, completion, and wellbore parameters) are used to perform a design of experiment at block 420 using Monte-Carlo simulations and Latin hypercube sampling, for example. An accurate simulator 422 performs a simulation at block 424 to build surrogate model via a database that includes input and output data. Adaptive sampling 426 is performed on surrogate model built at block 424 to perform a computationally fast and accurate emulation at block 428 to identify an optimal input configuration at decision block 430. In particular, at decision block 430, it is determined whether model convergence has occurred. If not, the database (block 424) is updated, but if so, ensemble of surrogate I-CWS models is updated at block 431. The model is then output and is combined with an output from a fast physics model 432 to perform a multiple I-CWI system simulation model 440 is used to perform the production misfit determination at decision block 406 as described herein.

The fast physics model 432 takes as input the system input u data and the identified parameters P, and an initial I-CWI fast physics model is generated at block 434. At block 436, uncertainty attributes are generated and are used to perform multiple I-MSW system model generation at block 438. The results of the fast physics model 432 are input into the multiple I-CWI system simulation model 440.

According to one or more embodiments described herein, the first dataset and the second dataset can be analyzed concurrently.

With continued reference to FIG. 3, at block 306, the processing system 12 performs validation on the first model and the second model by comparing the first result (e.g., the output flow 410 generated from the first dataset using the first model) to the second result (e.g., the output flow 410 generated from the second dataset using the second model). The comparison determines whether the first result and the second result match. In some examples, the matching can be determined by the first result being within a threshold tolerance of the second match (e.g., 1%, 3%, 5%, 10%, etc.). In other examples, the matching is based on an exact match between the models.

Responsive to the first result and the second result matching, the processing system 12, at block 308, modifies an operational action of a surface assembly (e.g., the drilling rig 8 of FIG. 1) based on at least one of the first result or the second result. Modifying an operational action can include modifying a trajectory of the tool 7, a weight on bit of the tool 7, a rate of rotation of the tool 7, etc. The operational action can be modified in real-time or near real-time according to one or more embodiments described herein.

Responsive to the first result and the second result not matching, the processing system 12, at block 310, updates at least one of the first model or the second model as shown in and as described with respect to FIGS. 4-12. For example, the first model and/or the second model can be updated using one or more of machine learning, optimization, fast physics modeling, etc.

In some examples, subsequent to updating the first model and/or the second model, the processing system 12 analyzes the first dataset by applying the first dataset to the first model to generate a third result. Similarly, in some examples, subsequent to updating the first model and/or the second model, the processing system 12 analyzes the second dataset by applying the second dataset to the second model to generate a fourth result. In such examples, the first and second datasets are used to generate new results (i.e., the third and fourth results) using the updated models. The processing system 12 can then use the new results to re-validate the first and second models by comparing the new results (i.e., comparing the third result to the fourth result). If the third result matches the fourth result, an operational action can be modified based on at least one of the third result or the fourth result. This leads to improved drilling operations by using updated models to make drilling decisions. If the third result does not match the third result, the models can be further updated, such as iteratively, until the models match.

Additional processes also may be included, and it should be understood that the processes depicted in FIG. 3 represent illustrations, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide technical solutions for multi-sensor data interpretation and predictive analytics for well intervention. These technical solutions provide for data and model verification and use results of analyzing data with different models to modify an operational action, for example, thus improving the efficiency of a surface assembly. By comparing the results of the data analysis, the results are determined to be accurate. Using more accurate, verified results improves downhole exploration and production efforts, and hydrocarbon recovery from a hydrocarbon reservoir is improved compared to conventional techniques.

Additional embodiments are also provided. For example, a method 1300 for processing downhole multisensory data representative of a well operations is provided. A physics-informed model, representative of a function of a well operation, is integrated into one or more computer processing systems (block 1302). The computer processing system uses the physics-informed model to fit a constant related to at least one of reservoir rock, fluid, thermal, completion and wellbore intervention properties. The computer processing system uses the physics-informed model to generate a prior probability distribution function. The computer processing system uses the physics-informed model to iteratively fuse input data originating from at least a first downhole sensor and a second downhole sensor with the prior probability distribution function to generate a posterior probability distribution function. The computer processing system uses the physics-informed model to process the posterior probability distribution function to generate in real-time an output. The output can be one or more of a zonal pressure, a temperature, and a strain profile prediction. The output can also or instead be an estimate of zonal flow allocation. At least one dynamic model relating zonal flow allocation can be applied to the probability distribution function.

In examples, the method 1300 can further include determining a noise artifact event through analysis of analysis of the input data from the first downhole sensor and using the noise artifact event to filter the input data from the second sensor. The method can further include that the development of the dynamic completion-wellbore intervention (CWI) models and the dynamic downhole multi-sensor measurement models is an iterative process. The iterative process is performed by: defining estimation of state variables and uncertain parameters which become elements of the state vector; defining nominal time propagation of the estimation variables and the uncertain parameters; defining nominal downhole multisensor measurement model; defining relationships between the estimation state variables, the uncertain parameters, and the downhole multisensor measurements; and verifying a nominal dynamic physics-driven model and a nominal downhole multisensor measurements.

In examples, a database of the downhole multisensor measurements is used to empirically verify the nominal dynamic physics-informed model and the nominal downhole multisensor measurements model. In examples, the database has a plurality of downhole sensor measurements with corresponding direct measurements.

In some examples, the method 1300 further includes combining the input signal from the first downhole sensor and the second downhole sensor. This can result in one or more of a generated measure of phase volumetric flow rates and/or a phase volumetric flow rate variability measure. The input data from the first downhole sensor can include permanent downhole gauge measurements. The method 1300 can further include determining a noise artifact event through analysis of the input data from the first downhole sensor, and using the noise artifact event to filter the input data from the second sensor.

Another embodiment is provided that includes a real-time (or near-real-time) state variable estimator. The real-time (or near-real time) state variable estimator includes a plurality of downhole sensor measurement inputs. At least of the measurement inputs is configured to receive an input indicative of zonal pressure and temperature values. The state variable estimator further includes a plurality of control inputs and a particle filter and optimization algorithms. The particle filter and optimization algorithms are configured to receive the plurality of measurements inputs and the plurality of control inputs to provide optimal estimation of state variables and model parameters of wellbore intervention operations in real-time or near-real-time. The state variable estimator further includes a system for receiving values of dynamic model parameters tuned by the particle filter-based optimizer. In examples, the state variable estimator further includes a decision support system configured to use the state variable estimator to determine a degradation of performance assessment and derive a decision. In examples, the state variable estimator further includes an intelligent control system configured to update operations of a completion and wellbore intervention systems based on the decision. In such examples, the decision can predict future completion and wellbore intervention operation conditions and perform dynamic optimization when performance falls below a predetermined threshold.

Set forth below are some embodiments of the foregoing disclosure:

Embodiment 1: A method including analyzing a first dataset by applying the first dataset to a first model to generate a first result; analyzing a second dataset by applying the second dataset to a second model to generate a second result; performing validation on the first model and the second model by comparing the first result to the second result; responsive to determining that the first result and the second result match, modifying an operational action of a surface assembly based on at least one of the first result or the second result; and responsive to determining that the first result and the second result do not match, updating at least one of the first model or the second model.

Embodiment 2: A method according to any prior embodiment, further comprising, subsequent to updating the at least one of the first model or the second model: analyzing the first dataset by applying the first dataset to the first model to generate a third result.

Embodiment 3: A method according to any prior embodiment, further comprising, subsequent to updating the at least one of the first model or the second model: analyzing the second dataset by applying the second dataset to the second model to generate a fourth result.

Embodiment 4: A method according to any prior embodiment, further comprising, subsequent to updating the at least one of the first model or the second model: re-performing validation on the first model and the second model by comparing the third result to the fourth result.

Embodiment 5: A method according to any prior embodiment, further comprising, subsequent to updating the at least one of the first model or the second model: responsive to determining that the third result and the fourth result match, modifying an operational action based on at least one of the third result or the fourth result.

Embodiment 6: A method according to any prior embodiment, further comprising, subsequent to updating the at least one of the first model or the second model: responsive to determining that the third result and the fourth result do not match, updating at least one of the first model or the second model.

Embodiment 7: A method according to any prior embodiment, wherein updating the at least one of the first model or the second model is performed iteratively.

Embodiment 8: A method according to any prior embodiment, wherein updating the at least one of the first model or the second model is performed using machine learning.

Embodiment 9: A method according to any prior embodiment, wherein updating the at least one of the first model or the second model is performed using an optimization technique.

Embodiment 10: A method according to any prior embodiment, wherein updating the at least one of the first model or the second model is performed using a fast physics technique.

Embodiment 11: A method according to any prior embodiment, further comprising: receiving the first dataset from one or more temperature sensors associated with the surface assembly; and receiving the second dataset from a one or more acoustic sensors associated with the surface assembly.

Embodiment 12: A system comprising: a surface assembly; and a processing system comprising: a memory comprising computer readable instructions; and a processing device for executing the computer readable instructions, the computer readable instructions controlling the processing device to perform operations comprising: analyzing a first dataset by applying the first dataset to a first model to generate a first result; analyzing a second dataset by applying the second dataset to a second model to generate a second result; performing validation on the first model and the second model by comparing the first result to the second result; responsive to determining that the first result and the second result match, modifying an operational action of the surface assembly based on at least one of the first result or the second result; and responsive to determining that the first result and the second result do not match, updating at least one of the first model or the second model.

Embodiment 13: A system according to any prior embodiment, wherein the first output is a first flow rate and wherein the second output is a second flow rate.

Embodiment 14: A system according to any prior embodiment, wherein the operations further comprise: receiving the first dataset from one or more temperature sensors associated with the surface assembly; and receiving the second dataset from a one or more acoustic sensors associated with the surface assembly.

Embodiment 15: A system according to any prior embodiment, wherein the first dataset comprises one of force data, pressure data, temperature data, acoustic data, and nuclear data, and wherein the second data comprises another one of the force data, the pressure data, the temperature data, the acoustic data, and the nuclear data.

Embodiment 16: A system according to any prior embodiment, wherein the operations further comprise: analyzing a third dataset by applying the third dataset to a third model to generate a third result; and performing validation on the third model by comparing the third result to one or more of the first result and the second result.

Embodiment 17: A system according to any prior embodiment, wherein the operations are performed in real-time.

Embodiment 18: A system according to any prior embodiment, wherein the first dataset comprises data collected from a first wellbore and wherein the second dataset comprises data collected from a second wellbore.

Embodiment 19: A method for processing downhole multisensor data representative of a well operations, the method including: using a physics-informed model, representative of function of a well operations, coded into one or more computer systems; using a fitting constant related to at least one of a reservoir rock, a fluid, a thermal, a completion, and a wellbore intervention property; generating a prior probability distribution function using the physics-informed model; repetitively fusing input data originating from at least a first downhole sensor and a second downhole sensor with the prior probability distribution function to generate a posterior probability distribution function; and processing the posterior probability distribution function with one or more computer systems to generate in real-time an output.

Embodiment 20: A method according to any prior embodiment, further comprising determining a noise artifact event through analysis of the input data from a first downhole sensor; and using the noise artifact event to filter the input data from the second sensor.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method for processing downhole multisensor data representative of a well operations, the method comprising:
    using a physics-informed model, representative of function of a well operations, coded into one or more computer systems;
    using a fitting constant related to at least one of a reservoir rock, a fluid, a thermal, a completion, and a wellbore intervention property;

updating the physics-informed model using a surrogate model that improves computational speed and is acceptably accurate to provide an updated physics-informed model;

generating a prior probability distribution function using the physics-informed model;

repetitively fusing input data originating continuously from at least a first downhole sensor and a second downhole sensor with the prior probability distribution function to generate a posterior probability distribution function, wherein the input data comprises a first value of a first physical property sensed by the first downhole sensor and a second value of a second physical property sensed by the second downhole sensor, the second physical property being different from the first physical property, and the method further comprises calculating a third value of a third physical property different from the first and second physical properties using the first and second values, wherein the first downhole sensor and the second downhole sensor are coupled to a drill tubular drilling a borehole in a formation and perform measurements while the borehole is being drilled; and processing the posterior probability distribution function with one or more computer systems to generate in real-time an output.

2. The method of claim 1, further comprising:
determining a noise artifact event through analysis of the input data from a first downhole sensor; and
using the noise artifact event to filter the input data from the second sensor.

3. The method of claim 1, wherein the first physical property comprises pressure, the second physical property comprises temperature, and the third physical property comprises flow rate.

4. The method of claim 1, further comprising:
determining if output of the surrogate model converges to a database;
using the surrogate model to update the physics-informed model in response to convergence; and
updating the surrogate model using adaptive sampling in response to non-convergence.

5. The method of claim 1, wherein the input data comprises a first value of a first physical property sensed by the first downhole sensor and a second value of a second physical property sensed by the second downhole sensor, the second physical property being different from the first physical property, and the method further comprises separately calculating a third value of a third physical property different from the first and second physical properties using the first and second values separately.

6. The method of claim 5, further comprising:
comparing the third value from the calculating using the first value against the separately calculated third value from the calculating using the second value to determine if the compared third values agree;
accepting accuracy of the physics-informed model in response to the compared third values being in agreement; and
adjusting input parameters to the physics-informed model in response to the compared third values not being in agreement.

7. The method of claim 1, wherein the first downhole sensor and the second downhole sensor are disposed in a bottom-hole-assembly (BHA) coupled to the drill tubular.

8. The method of claim 1, wherein the repetitively fusing input data originating continuously from at least a first downhole sensor and a second downhole sensor is performed in real time.

9. The method of claim 1, further comprising controlling a wellbore operation in real time using the output.

10. The method of claim 9, wherein controlling a wellbore operation comprises controlling at least one of a trajectory of a drill tool, a weight on bit of the drill tool, or a rate of rotation of the drill tool.

* * * * *